United States Patent
Ench

(10) Patent No.: US 9,795,248 B2
(45) Date of Patent: Oct. 24, 2017

(54) BREW BASKET WITH ADJUSTABLE FLOW RATE

(71) Applicant: Grindmaster Corporation, Louisville, KY (US)

(72) Inventor: Robert M. Ench, Louisville, KY (US)

(73) Assignee: Grindmaster Corporation, Louisville, KY (US)

( * ) Notice: Subject to any disclaimer, the term of this patent is extended or adjusted under 35 U.S.C. 154(b) by 0 days.

(21) Appl. No.: 15/282,410

(22) Filed: Sep. 30, 2016

(65) Prior Publication Data

US 2017/0095110 A1    Apr. 6, 2017

Related U.S. Application Data

(60) Provisional application No. 62/237,333, filed on Oct. 5, 2015.

(51) Int. Cl.
| | | |
|---|---|---|
| *A47J 31/06* | (2006.01) | |
| *A47J 31/44* | (2006.01) | |
| *A47J 31/46* | (2006.01) | |

(52) U.S. Cl.
CPC ......... *A47J 31/446* (2013.01); *A47J 31/0615* (2013.01); *A47J 31/0621* (2013.01); *A47J 31/46* (2013.01)

(58) Field of Classification Search
CPC ................ A47J 31/0605; A47J 31/0621; A47J 31/0615; A47J 31/0663
USPC .................................. 99/299, 306, 304, 283
See application file for complete search history.

(56) References Cited

U.S. PATENT DOCUMENTS

| | | | |
|---|---|---|---|
| 4,798,222 A * | 1/1989 | Kauffman | A47J 31/0605 137/132 |
| 4,924,922 A | 5/1990 | Johnson | |
| 6,148,717 A | 11/2000 | Lassota | |
| 6,412,394 B2 * | 7/2002 | Bonanno | A47J 31/0663 426/433 |
| 6,439,105 B1 | 8/2002 | Ford | |
| 6,565,906 B1 | 5/2003 | Lassota | |
| 6,571,685 B1 | 6/2003 | Lassota | |

(Continued)

OTHER PUBLICATIONS

Korean Intellectual Property Office, International Search Report and Written Opinion issued in corresponding Application No. PCT/US2016/054836, dated Feb. 1, 2017.

(Continued)

*Primary Examiner* — Reginald L Alexander
(74) *Attorney, Agent, or Firm* — Stites & Harbison, PLLC; David W. Nagle, Jr.

(57) ABSTRACT

A brew basket includes a body defining an internal cavity for holding a quantity of a beverage component, such that, in use, water introduced into the internal cavity contacts and passes through the beverage component to produce a brewed beverage. The brew basket further includes an outlet orifice for the brewed beverage defined by a downward extension of the brew basket. A cap engages the downward extension of the brew basket, with an opening defined through a bottom wall of the cap. A gasket is received in the cap, and a thickness of the gasket determines a position of the cap relative to the downward extension of the brew basket, and thus determines a flow rate of the brewed beverage from the outlet orifice through the opening defined through the bottom wall of the cap.

18 Claims, 9 Drawing Sheets

(56) References Cited

U.S. PATENT DOCUMENTS

| | | |
|---|---|---|
| 6,576,282 B1 | 6/2003 | Lassota |
| 6,705,208 B2 | 3/2004 | Lassota |
| 6,713,109 B1 | 3/2004 | Lassota |
| 6,722,265 B2 * | 4/2004 | Priley .................. A23F 3/18 99/299 |
| 6,772,676 B2 | 8/2004 | Lassota |
| 6,889,598 B2 | 5/2005 | Wroblewski |
| 7,150,219 B2 * | 12/2006 | De'Longhi ......... A47J 31/4496 99/299 |
| 7,631,593 B2 | 12/2009 | Lassota et al. |
| 7,866,255 B1 | 1/2011 | Wroblewski et al. |
| 2010/0018408 A1 | 1/2010 | Lassota |
| 2010/0199852 A1 | 8/2010 | Webster et al. |
| 2013/0019754 A1 | 1/2013 | Tien et al. |

OTHER PUBLICATIONS

FETCO User's Guide, Model: TBS-2121, Jun. 2013.

* cited by examiner

BREW BASKET WITH ADJUSTABLE FLOW RATE

CROSS-REFERENCE TO RELATED APPLICATIONS

The present application claims priority to U.S. patent application Ser. No. 62/237,333 filed on Oct. 5, 2015, the entire disclosure of which is incorporated herein by reference.

BACKGROUND OF THE INVENTION

The present invention relates to a brewer for brewing a beverage, such as tea or coffee, and, more particularly, to a brew basket for a brewer that allows for an adjustable flow rate, thus controlling the strength and/or quality of the brewed beverage.

In a common brewer, a brew basket holds a quantity of tea, ground coffee, or similar beverage component below a spray head. The brewer includes a plumbing system in which water is drawn from a water reservoir (or from another water source). As water is drawn from the reservoir and into a hot water tank, hot water is forced from the hot water tank to a spray head. The spray head distributes the hot water over and through the quantity of tea, ground coffee, or similar beverage component, and the brewed beverage is dispensed through an outlet orifice (or drain hole) into a cup or similar receptacle.

With respect to such an outlet orifice in the brew basket, by varying the size of the outlet orifice, the flow rate through the brew basket can be altered. Specifically, the time the hot water spends in contact with the beverage component (i.e., the steep time) can be changed. For example, with a limited flow rate through the beverage component, the hot water stays in contact with the beverage component for a longer period of time, increasing the strength of the brewed beverage. However, in most cases, the size of the outlet orifice cannot be readily altered.

SUMMARY OF THE INVENTION

The present invention is a brew basket with an adjustable flow rate.

A brewer includes a housing, along with a brew basket that is selectively installed and secured to the housing and holds a quantity of tea, ground coffee, or similar beverage component below a spray head installed in the housing. As with prior art brewer constructions, the brewer also includes a plumbing system in which water is drawn from a water reservoir (or from another source of water). As water is drawn from the reservoir and into a hot water tank, hot water is forced from the hot water tank to the spray head. The spray head distributes the hot water over and through the quantity of tea, ground coffee, or similar beverage component held in the brew basket, and the brewed beverage is dispensed through an outlet orifice (or drain hole) into a cup or similar receptacle.

An exemplary brew basket made in accordance with the present invention has a generally cylindrical body defining an internal cavity and an open top. In some embodiments, the open top is circumscribed by an upper flange. Furthermore, in some embodiments, ribs extend from the inner wall surface around the circumference of the cylindrical body within the internal cavity, such that the ribs are configured to receive and support a filter, pod, or other media, which, in turn, supports or encloses the tea, ground coffee, or similar beverage component. Thus, hot water introduced by a spray head above the open top of the brew basket contacts and passes through the tea, ground coffee, or similar beverage component to produce a brewed beverage, which moves downward under the force of gravity and through the filter, pod, or other media.

A bottom floor of the brew basket is sloped toward the outlet orifice, and so, the brewed beverage exits through the outlet orifice. In the brew basket of the present invention, the outlet orifice is defined by a downward extension of the brew basket and can be characterized as including (i) a first substantially cylindrical channel having a predetermined inner diameter that begins at and extends downwardly from the bottom floor of the brew basket, with (ii) a second flared (larger diameter) channel at the opposite end of the substantially cylindrical channel. A cap then engages the downward extension of the brew basket to cover the outlet orifice. In some embodiments, the cap thus includes internal threads that engage corresponding external threads on the surface of the downward extension of the brew basket, such that the cap can be screwed onto the downward extension of the brew basket.

The cap includes an internal conical element which extends upwardly from a bottom wall of the cap. The internal conical element has a substantially hollow interior, and its base circumscribes a central opening defined through the bottom wall of the cap. The internal conical element defines an upper surface, with a hole then defined through the upper surface. Furthermore, there are one or more openings defined through the lateral surface of the internal conical element. Finally, an annular gasket is received in the cap and serves as a seal between the cap and the downward extension of the brew basket.

In one case, when the gasket is a first predetermined thickness, brewed beverage flowing from the brew basket flows freely through the first substantially cylindrical channel and into the second flared (larger diameter) channel. From there, the brewed beverage passes through the hole defined through the upper surface of the internal conical element, through the hollow interior of the internal conical element, and out the central opening defined through the bottom wall of the cap. At the same time, the brewed beverage enters the hollow interior of the internal conical element through the one or more openings defined through the lateral surface of the internal conical element and then out the central opening defined through the bottom wall of the cap.

In another case, when the gasket is a second predetermined thickness, brewed beverage flowing from the brew basket flows through the first substantially cylindrical channel, and some brewed beverage flows into the second flared (larger diameter) channel. The brewed beverage passes through the hole defined through the upper surface of the internal conical element, through the hollow interior of the internal conical element, and out the central opening defined through the bottom wall of the cap. However, very little brewed beverage flows over the lateral surface of the internal conical element and through the one or more openings.

In another case, when the gasket is a third predetermined thickness, brewed beverage flowing from the brew basket flows freely through the first substantially cylindrical channel, but minimal brewed beverage flows into the second flared (larger diameter) channel because there is only minimal clearance between the lateral surface of the internal conical element and the wall of the substantially cylindrical channel. Thus, the brewed beverage primarily passes through the hole defined through the upper surface of the internal conical element, through the hollow interior of the internal conical element, and out the central opening defined through the bottom wall of the cap. And, only a limited amount of brewed beverage flows over the lateral surface of the internal conical element and through the one or more openings.

In another case, when the gasket is a fourth predetermined thickness, brewed beverage flowing from the brew basket can flow freely through the first substantially cylindrical channel, but not into the second flared (larger diameter) channel. There is effectively an interference fit between the lateral surface of the internal conical element and the wall of the substantially cylindrical channel, which blocks substantially all flow over the lateral surface of the internal conical element and through the one or more openings.

In short, decreasing the thickness of the gasket results in a reduction of the flow rate. Thus, the brew basket of the present invention allows for an adjustable flow rate and control of the strength and/or quality of the brewed beverage.

DETAILED DESCRIPTION OF THE INVENTION

The present invention is a brew basket with an adjustable flow rate.

Figure 1:
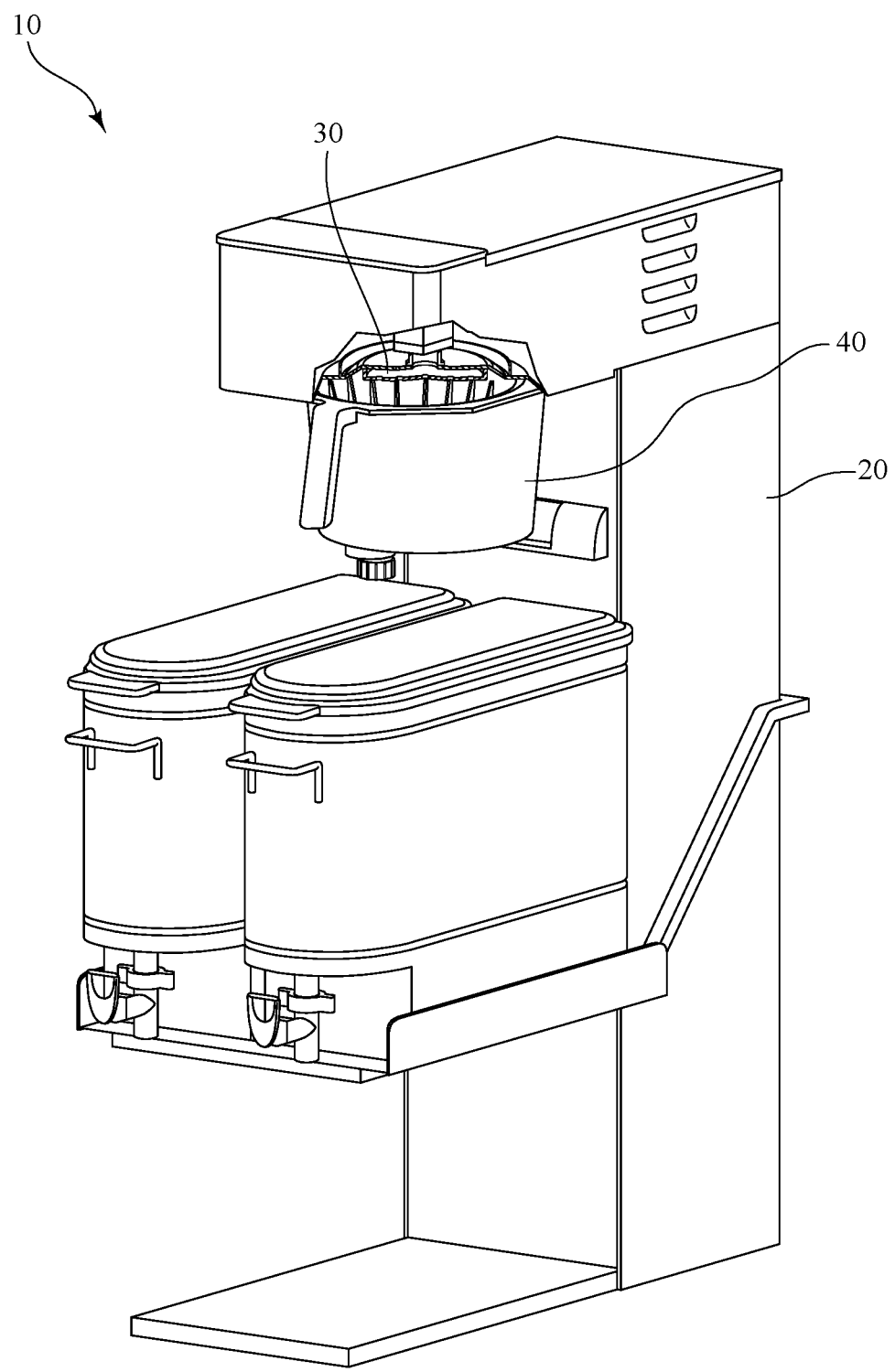
FIG. 1 is a perspective view of an exemplary brewer made in accordance with the present invention.

Referring first to FIG. 1, a brewer 10 includes a housing 20, along with a brew basket 40 that is selectively installed and secured to the housing 20 and holds a quantity of tea, ground coffee, or similar beverage component below a spray head 30 installed in the housing 20. As with prior art brewer constructions, the brewer 10 also includes a plumbing system in which water is drawn from a water reservoir (or from another source or water). As water is drawn from the reservoir and into a hot water tank, hot water is forced from the hot water tank to the spray head 30. The spray head 30 distributes the hot water over and through the quantity of tea, ground coffee, or similar beverage component held in the brew basket 40, and the brewed beverage is dispensed through an outlet orifice (or drain hole) 41 into a cup or similar receptacle.

Figure 2:
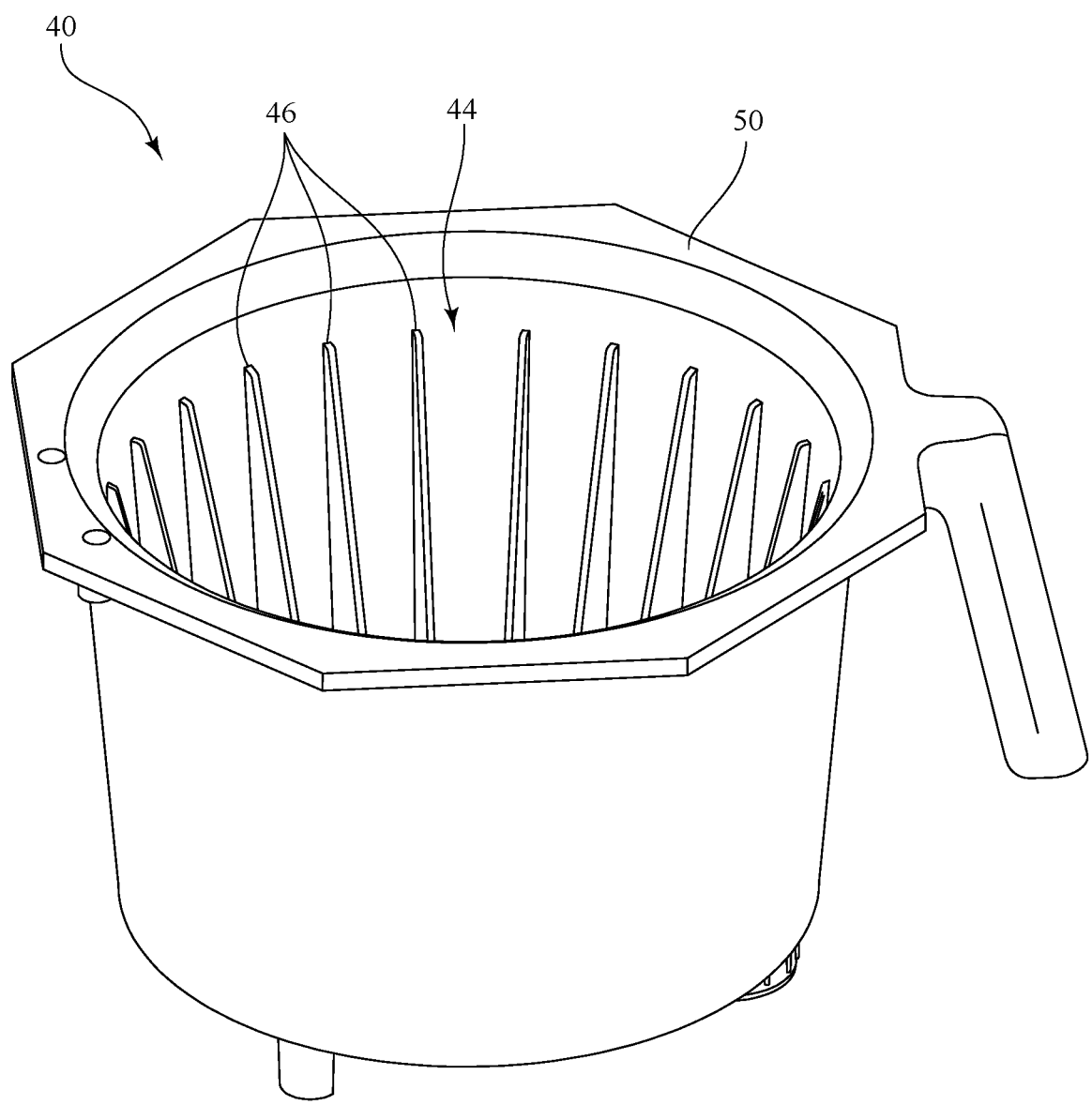
FIG. 2 is a perspective view of the brew basket of the exemplary brewer of FIG. 1.
Figure 3:
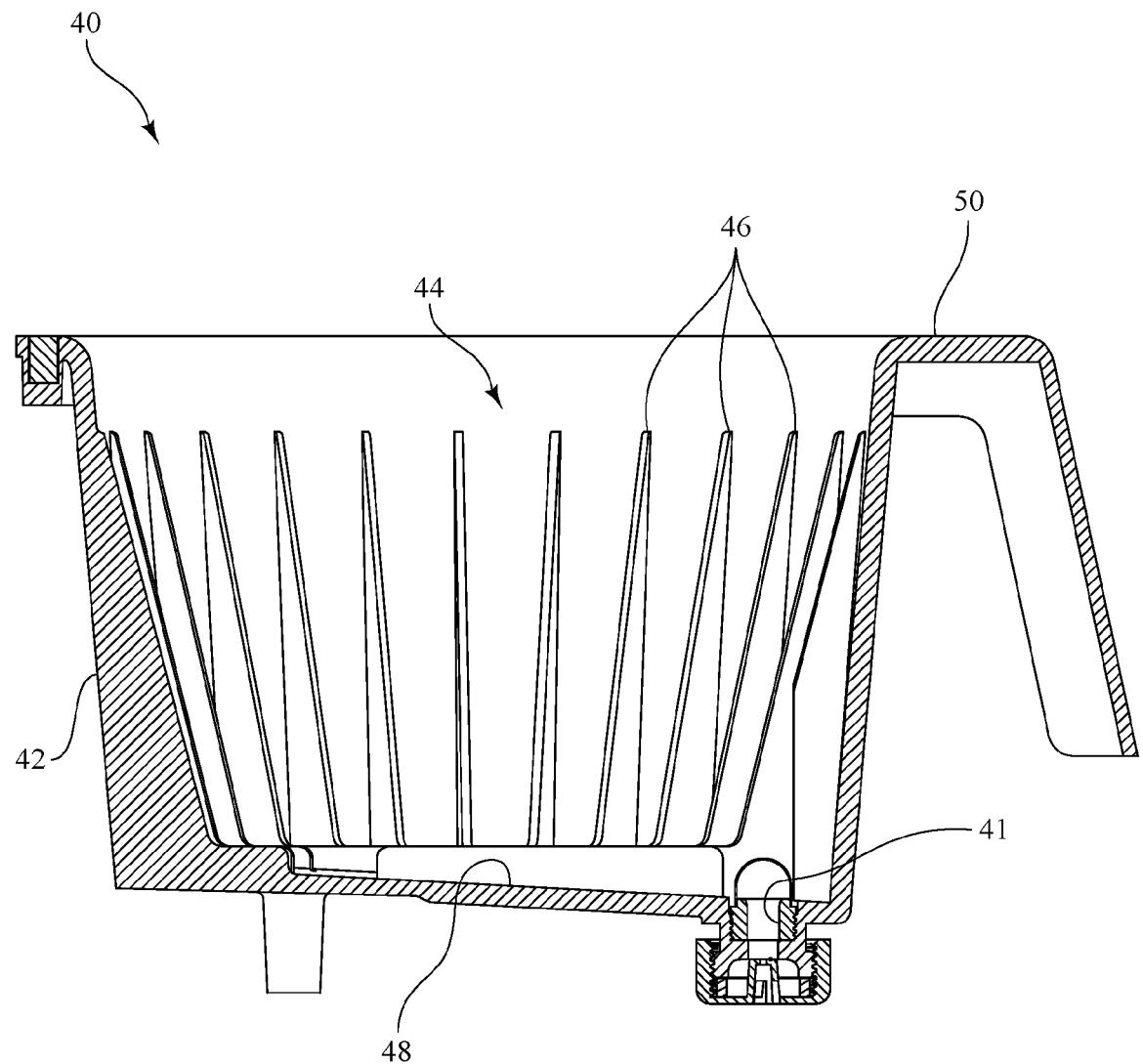
FIG. 3 is a side sectional view of the brew basket of FIG. 2.

Referring now to FIGS. 2-3, an exemplary brew basket 40 made in accordance with the present invention has a generally cylindrical body 42 defining an internal cavity 44 and an open top. In this exemplary embodiment, the open top is circumscribed by an upper flange 50. Furthermore, ribs 46 extend from the inner wall surface around the circumference of the cylindrical body 42 within the internal cavity 44, such that the ribs 46 are configured to receive and support a filter, pod, or other media, which, in turn, supports or encloses the tea, ground coffee, or similar beverage component. Thus, hot water introduced by a spray head 30 (FIG. 1) above the open top of the brew basket 40 contacts and passes through the tea, ground coffee, or similar beverage component to produce a brewed beverage, which moves downward under the force of gravity and through the filter, pod, or other media.

Referring now to FIG. 3, a bottom floor 48 of the brew basket 40 is sloped toward the outlet orifice, and so, the brewed beverage exits through the outlet orifice 41.

FIGS. 4-7 are enlarged sectional views of the brew basket 40 in the vicinity of the outlet orifice 41. As shown, the outlet orifice 41 is defined by a downward extension 51 of the brew basket 40 and can be characterized as including (i) a first substantially cylindrical channel 41a having a predetermined inner diameter that begins at and extends downwardly from the bottom floor 48 of the brew basket 40, with (ii) a second flared (larger diameter) channel 41b at the opposite end of the substantially cylindrical channel 41a. Furthermore, in this exemplary embodiment, and as shown in FIGS. 4-7, the substantially cylindrical channel 41a is defined, in part, by an insert 52 that is installed in an internal cavity defined by the downward extension 51 of the brew basket 40; however, the function is the same irrespective of whether an insert 52 is used or whether the downward extension 51 of the brew basket 40 alone defines the substantially cylindrical channel 41a.

Referring still to FIGS. 4-7, a cap 60 then engages the downward extension 51 of the brew basket 40 to cover the outlet orifice 41. In this regard, in this exemplary embodiment, the cap includes internal threads 60a that engage corresponding external threads 51a on the surface of the downward extension 51 of the brew basket 40, such that the cap 60 can be screwed onto the downward extension 51 of the brew basket 40.

Figure 6:
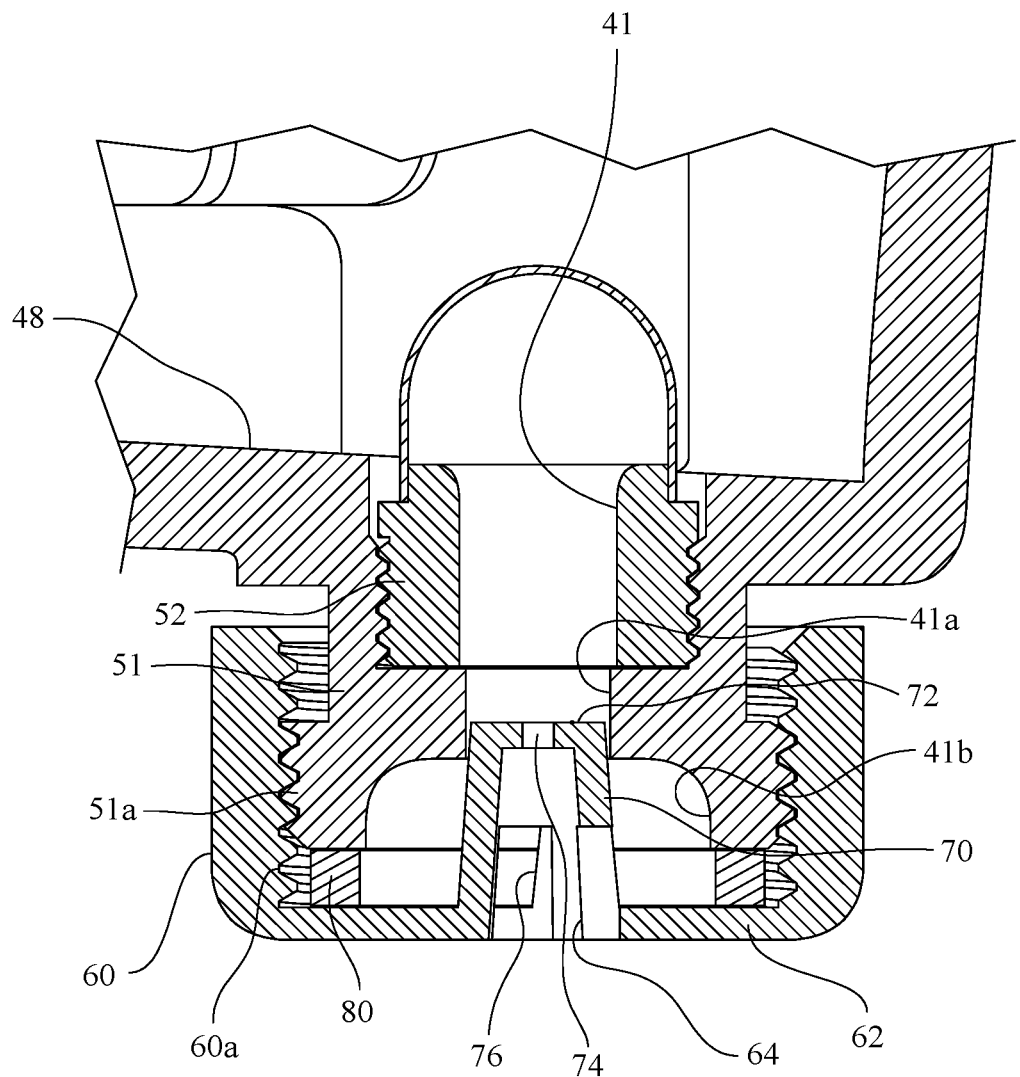
FIG. 6 is an enlarged sectional view similar to FIG. 4, wherein the annular gasket has an approximate thickness of 0.125 inches.
Figure 7:
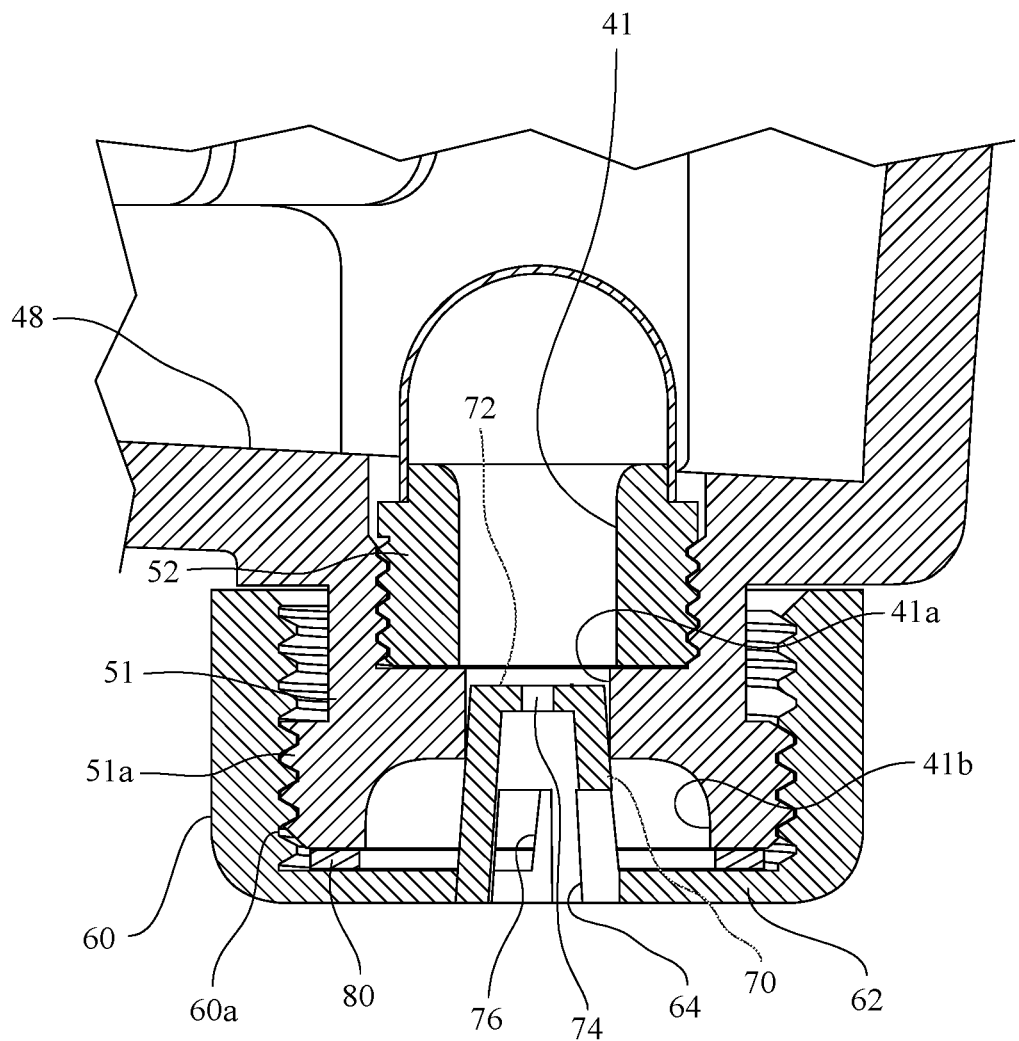
FIG. 7 is an enlarged sectional view similar to FIG. 4, wherein the annular gasket has an approximate thickness of 0.0625 inches.
Figure 8:
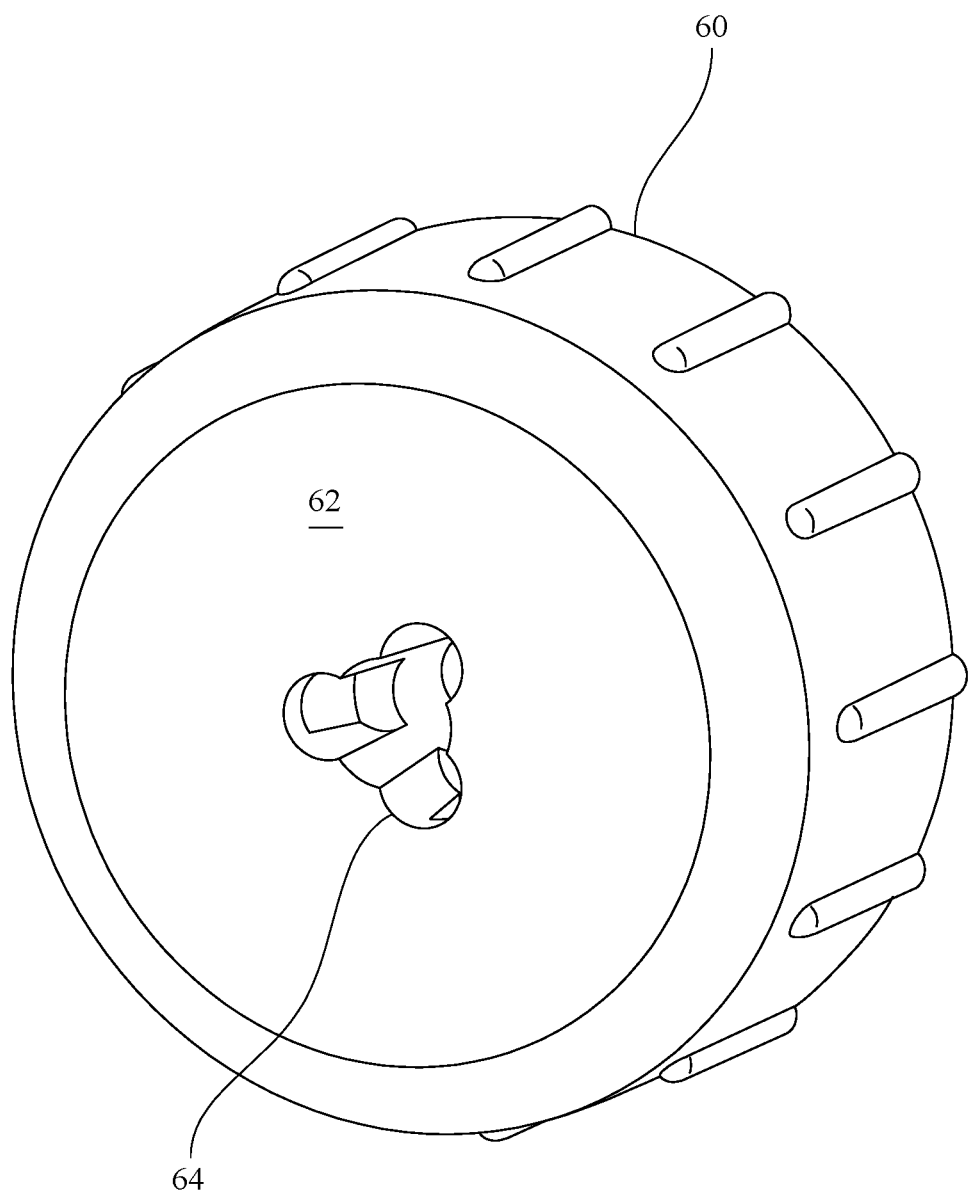
FIG. 8 is a perspective view of a cap that engages a downward extension of the brew basket to cover the outlet orifice from the brew basket.
Figure 9:
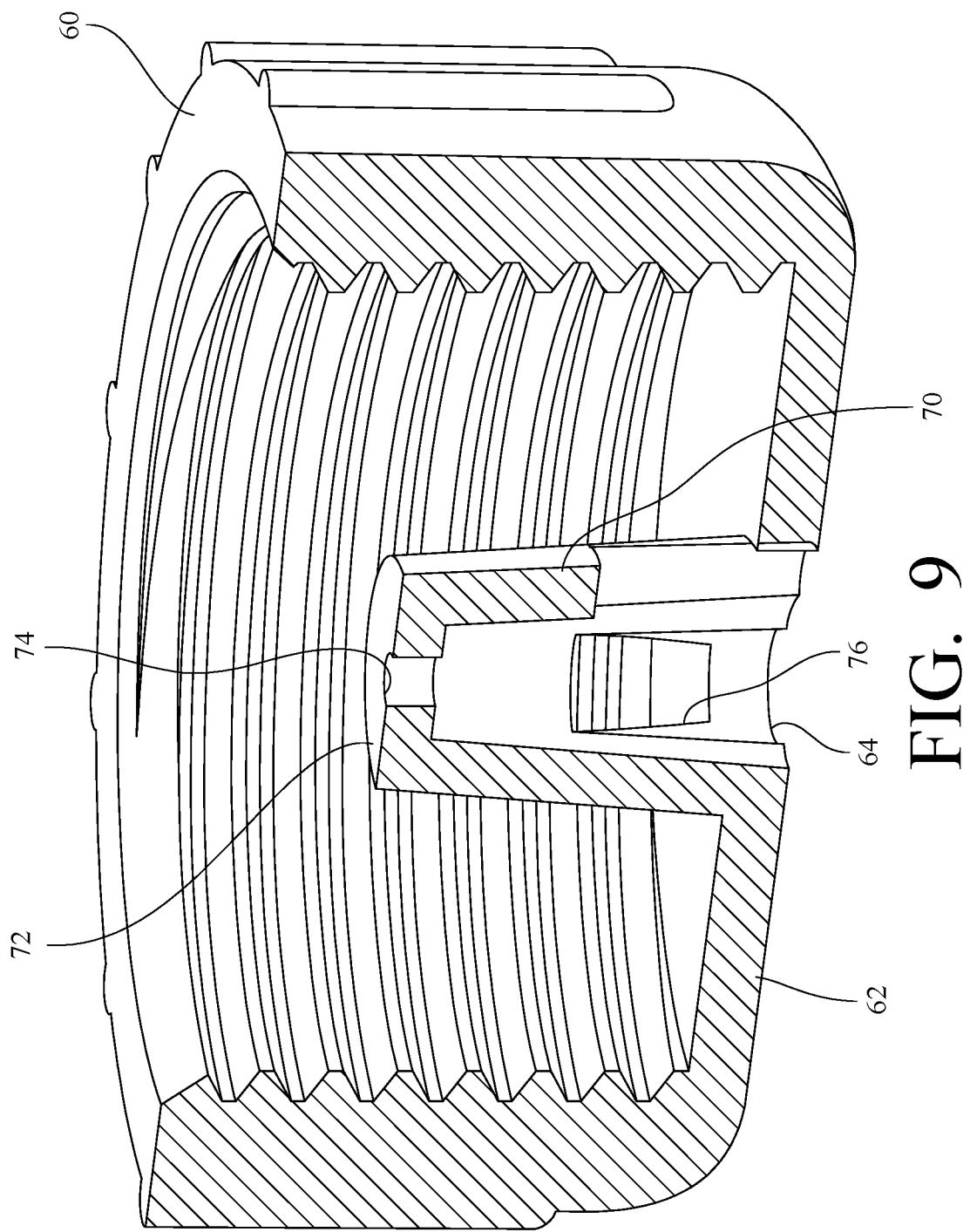
FIG. 9 is a side sectional view of the cap of FIG. 8.

Referring still to FIGS. 4-7, along with FIGS. 8-9, the cap 60 includes an internal conical element 70 which extends upwardly from a bottom wall 62 of the cap 60. The internal conical element 70 has a substantially hollow interior, and its base circumscribes a central opening 64 defined through the bottom wall 62 of the cap 60. The internal conical element 70 is also truncated and defines an upper surface 72, with a hole 74 then defined through the upper surface 72. Furthermore, there are one or more openings 76 defined through the lateral surface of the internal conical element 70; in this exemplary embodiment, there are three such openings spaced at approximately 120-degree intervals around the internal conical element 70.

Figure 4:
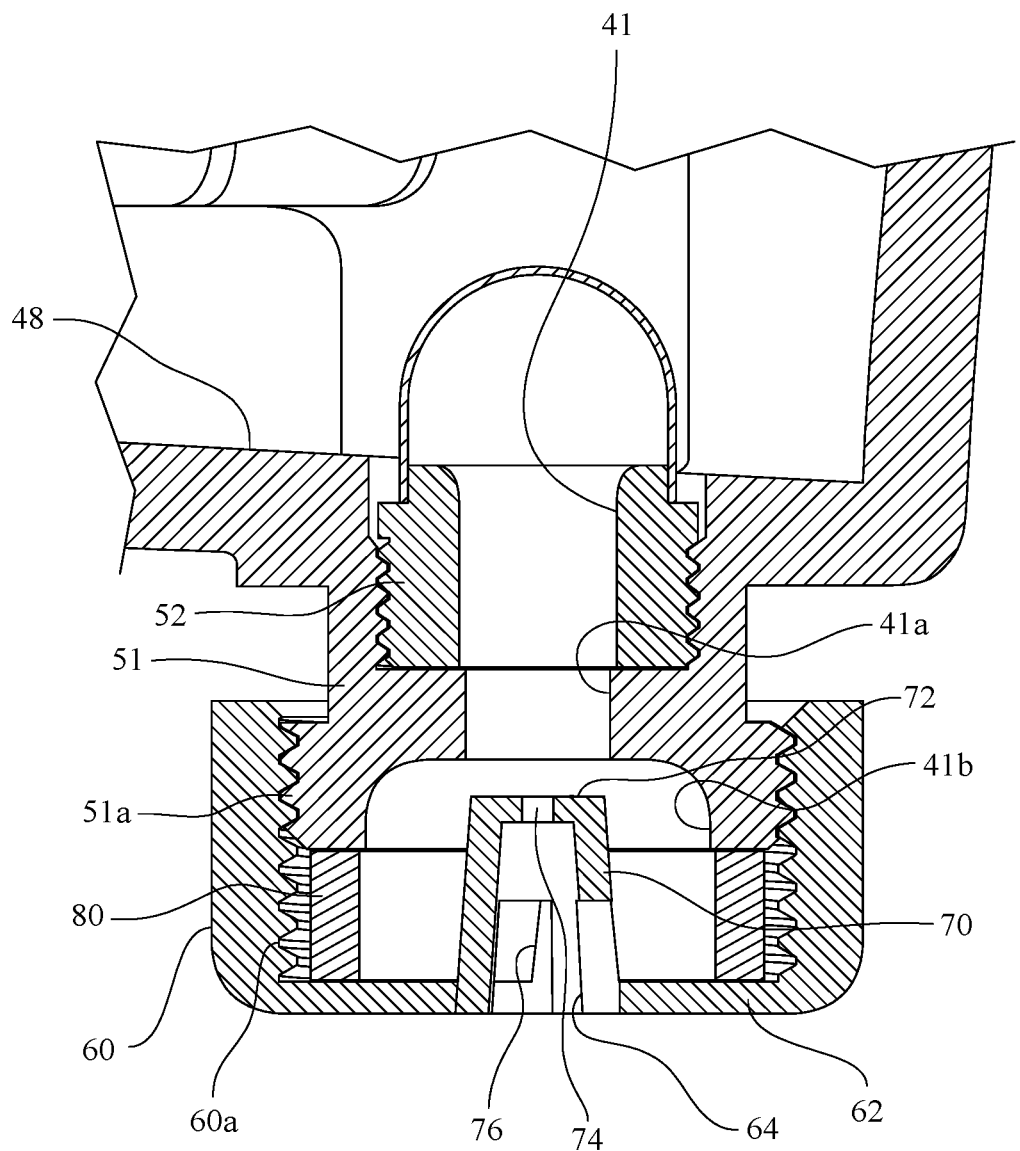
FIG. 4 is an enlarged sectional view of the brew basket of FIG. 2 in the vicinity of the outlet orifice, and including an annular gasket with an approximate thickness of 0.25 inches.

Finally, referring still to FIGS. 4-7, an annular gasket 80 is received in the cap 60 and serves as a seal between the cap 60 and the downward extension 51 of the brew basket 40. In FIG. 4, the gasket 80 is one-quarter inch (0.25 inches) thick. Thus, when the gasket 80 is installed in the cap 60, brewed beverage flowing from the brew basket 40 flows freely through the first substantially cylindrical channel 41a and into the second flared (larger diameter) channel 41b. From there, the brewed beverage passes through the hole 74 defined through the upper surface 72 of the internal conical element 70, through the hollow interior of the internal conical element 70, and out the central opening 64 defined through the bottom wall 62 of the cap 60. At the same time, the brewed beverage enters the hollow interior of the internal conical element 70 through the one or more openings 76 defined through the lateral surface of the internal conical element 70 and then out the central opening 64 defined through the bottom wall 62 of the cap 60.

Figure 5:
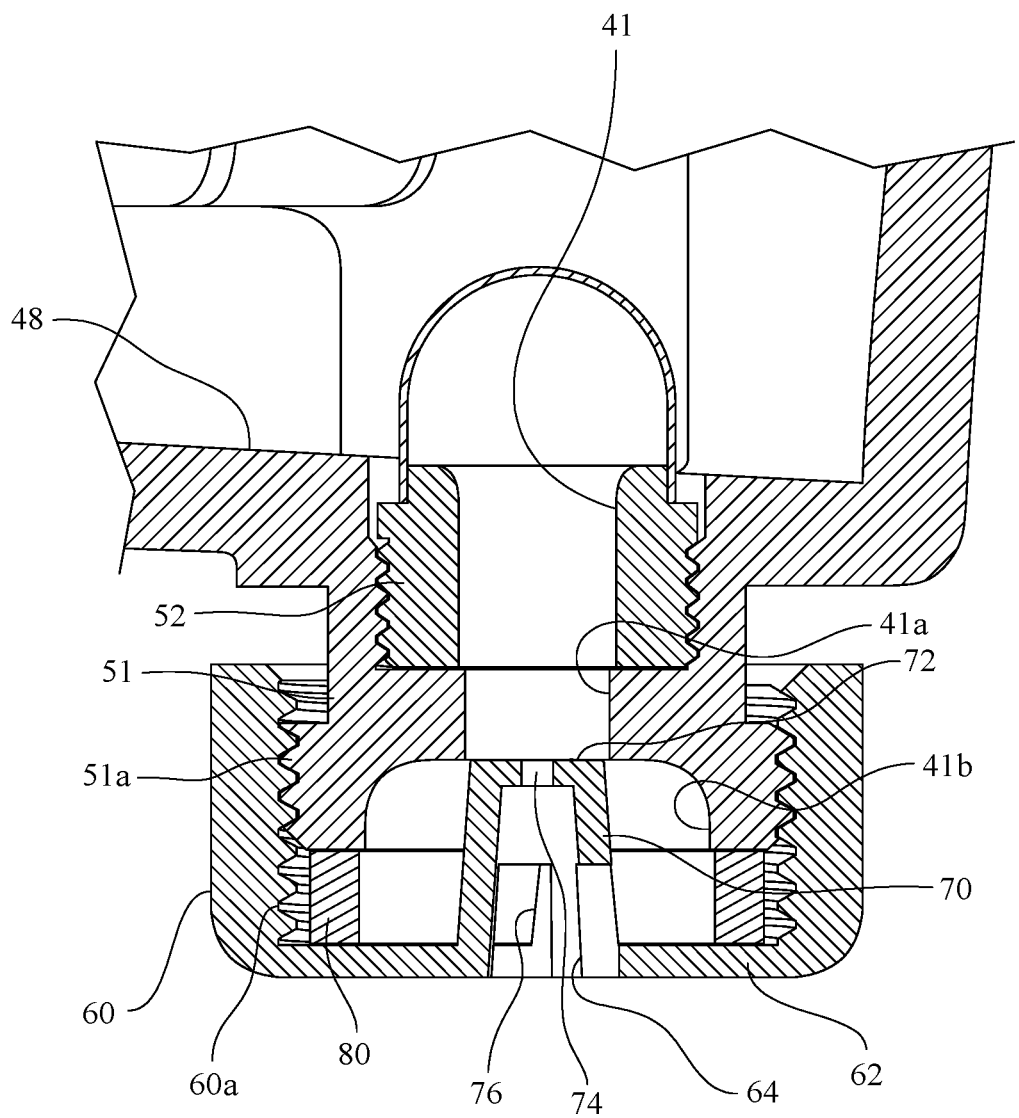
FIG. 5 is an enlarged sectional view similar to FIG. 4, wherein the annular gasket has an approximate thickness of 0.1875 inches.

In FIG. 5, the gasket 80 is three-sixteenths inch (0.1875 inches) thick. Thus, when the gasket 80 is installed in the cap 60, brewed beverage flowing from the brew basket 40 flows through the first substantially cylindrical channel 41a, and some brewed beverage flows into the second flared (larger diameter) channel 41b. The brewed beverage passes through the hole 74 defined through the upper surface 72 of the internal conical element 70, through the hollow interior of the internal conical element 70, and out the central opening 64 defined through the bottom wall 62 of the cap 60. However, very little brewed beverage flows over the lateral surface of the internal conical element 70 and through the one or more openings 76. Thus, the flow rate is reduced as compared to FIG. 4.

In FIG. 6, the gasket 80 is one-eighth inch (0.125 inches) thick. Thus, when the gasket 80 is installed in the cap 60, brewed beverage flowing from the brew basket 40 flows freely through the first substantially cylindrical channel 41a, but minimal brewed beverage flows into the second flared (larger diameter) channel 41b because there is only minimal clearance between the lateral surface of the internal conical element 70 and the wall of the substantially cylindrical channel 41a. Thus, the brewed beverage primarily passes through the hole 74 defined through the upper surface 72 of the internal conical element 70, through the hollow interior of the internal conical element 70, and out the central opening 64 defined through the bottom wall 62 of the cap 60. And, only a limited amount of brewed beverage flows over the lateral surface of the internal conical element 70 and through the one or more openings 76. Thus, the flow rate is reduced as compared to FIGS. 4 and 5.

In FIG. 7, the gasket 80 is one-sixteenth inch (0.0625 inches) thick. Thus, when the gasket 80 is installed in the cap 60, brewed beverage flowing from the brew basket 40 can flow freely through the first substantially cylindrical channel 41a, but not into the second flared (larger diameter) channel 41b. There is effectively an interference fit between the lateral surface of the internal conical element 70 and the wall of the substantially cylindrical channel 41a, which blocks substantially all flow over the lateral surface of the internal conical element 70 and through the one or more openings 76. Thus, the flow rate is reduced as compared to FIGS. 4, 5, and 6.

In short, decreasing the thickness of the gasket 80 results in a reduction of the flow rate. Thus, the brew basket 40 of the present invention allows for an adjustable flow rate and control of the strength and/or quality of the brewed beverage.

For example, Table A is a chart that illustrates the flow rate through the exemplary brew basket 40 based on the thickness of the gasket 80.

TABLE A

| Thickness (inches) | Volume (oz) | Time (s) | Flow Rate (oz/s) | Flow Rate (gpm) |
| --- | --- | --- | --- | --- |
| 0.03 | 32 | 165 | 0.194 | 0.091 |
| 0.06 | 32 | 150 | 0.213 | 0.100 |
| 0.09 | 32 | 134 | 0.239 | 0.112 |

TABLE A-continued

| Thickness (inches) | Volume (oz) | Time (s) | Flow Rate (oz/s) | Flow Rate (gpm) |
| --- | --- | --- | --- | --- |
| 0.125 | 32 | 112 | 0.286 | 0.134 |
| 0.185 | 32 | 92 | 0.348 | 0.163 |
| 0.2065 | 32 | 72 | 0.444 | 0.209 |
| 0.25 | 32 | 47 | 0.681 | 0.320 |

In practice, the brew basket 40 can thus be provided with gaskets 80 of multiple thicknesses, and an operator can install a selected gasket 80 in the cap 60 that provides the desired strength and/or quality of the brewed beverage.

One of ordinary skill in the art will recognize that additional embodiments are possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the present invention.

What is claimed is:

1. A brew basket kit, comprising:
a brew basket, including
a body defining an internal cavity for holding a quantity of a beverage component, such that, in use, water introduced into the internal cavity contacts and passes through the beverage component to produce a brewed beverage;
a downward extension that defines an outlet orifice for the brewed beverage, and
a cap engaging the downward extension of the brew basket, with an opening defined through a bottom wall of the cap; and
multiple gaskets, each of the multiple gaskets being configured for installation in the cap, and each of the multiple gaskets having a different predetermined thickness, wherein the predetermined thickness of each of the multiple gaskets corresponds to a particular flow rate of the brewed beverage from the outlet orifice through the opening defined through the bottom wall of the cap.

2. The brew basket kit as recited in claim 1, wherein the cap includes an internal conical element which extends upwardly from the bottom wall of the cap, wherein the internal conical element has a substantially hollow interior and a base that circumscribes the opening which is defined through the bottom wall of the cap, wherein the internal conical element defines an upper surface, with a hole defined through the upper surface, and wherein the internal conical element further defines one or more openings through a lateral surface of the internal conical element, such that the brewed beverage (i) passes through the hole defined through the upper surface of the internal conical element, through the hollow interior of the internal conical element, and out the opening defined through the bottom wall of the cap, and (ii) in some cases, depending on the thickness of a selected one of the multiple gaskets, also enters the hollow interior of the internal conical element through the one or more openings defined through the lateral surface of the internal conical element and then out the opening defined through the bottom wall of the cap.

3. The brew basket kit as recited in claim 1, wherein the outlet orifice is characterized as including (i) a first substantially cylindrical channel having a predetermined inner diameter that begins at and extends downwardly from a bottom floor of the brew basket, with (ii) a second flared channel at an opposite end of the substantially cylindrical channel.

4. The brew basket kit as recited in claim 3, wherein the cap includes an internal conical element which extends upwardly from the bottom wall of the cap, into the second flared channel of the outlet orifice, and, in some cases, depending on a thickness of the selected one of the multiple gaskets, extends into the first substantially cylindrical channel of the outlet orifice.

5. The brew basket as recited in claim 4, wherein the internal conical element has a substantially hollow interior and a base that circumscribes the opening which is defined through the bottom wall of the cap, wherein the internal conical element defines an upper surface, with a hole defined through the upper surface, and wherein the internal conical element further defines one or more openings through a lateral surface of the internal conical element, such that the brewed beverage (i) passes through the hole defined through the upper surface of the internal conical element, through the hollow interior of the internal conical element, and out the opening defined through the bottom wall of the cap, and (ii) in some cases, depending on the thickness of the selected one of the multiple gaskets, also enters the hollow interior of the internal conical element through the one or more openings defined through the lateral surface of the internal conical element and then out the opening defined through the bottom wall of the cap.

6. The brew basket as recited in claim 1, wherein the cap includes internal threads that engage corresponding external threads of the downward extension of the brew basket.

7. A brew basket, comprising:
a body defining an internal cavity for holding a quantity of a beverage component, such that, in use, water introduced into the internal cavity contacts and passes through the beverage component to produce a brewed beverage;
an outlet orifice for the brewed beverage defined by a downward extension of the brew basket;
a cap engaging the downward extension of the brew basket, with an opening defined through a bottom wall of the cap; and
a gasket received in the cap, wherein a thickness of the gasket determines a position of the cap relative to the downward extension of the brew basket, and thus determines a flow rate of the brewed beverage from the outlet orifice through the opening defined through the bottom wall of the cap;
wherein the cap includes an internal conical element which extends upwardly from the bottom wall of the cap, wherein the internal conical element has a substantially hollow interior and a base that circumscribes the opening which is defined through the bottom wall of the cap, wherein the internal conical element defines an upper surface, with a hole defined through the upper surface, and wherein the internal conical element further defines one or more openings through a lateral surface of the internal conical element, such that the brewed beverage (i) passes through the hole defined through the upper surface of the internal conical element, through the hollow interior of the internal conical element, and out the opening defined through the bottom wall of the cap, and (ii) in some cases, depending on the thickness of the gasket, also enters the hollow interior of the internal conical element through the one or more openings defined through the lateral surface of the internal conical element and then out the opening defined through the bottom wall of the cap.

8. The brew basket as recited in claim 7, wherein the cap includes internal threads that engage corresponding external threads of the downward extension of the brew basket.

9. A brew basket, comprising:
a body defining an internal cavity for holding a quantity of a beverage component, such that, in use, water introduced into the internal cavity contacts and passes through the beverage component to produce a brewed beverage;
an outlet orifice for the brewed beverage defined by a downward extension of the brew basket;
a cap engaging the downward extension of the brew basket with an opening defined through a bottom wall of the cap; and
a gasket received in the cap, wherein a thickness of the gasket determines a position of the cap relative to the downward extension of the brew basket, and thus determines a flow rate of the brewed beverage from the outlet orifice through the opening defined through the bottom wall of the cap;
wherein the outlet orifice is characterized as including (i) a first substantially cylindrical channel having a predetermined inner diameter that begins at and extends downwardly from a bottom floor of the brew basket, with (ii) a second flared channel at an opposite end of the substantially cylindrical channel.

10. The brew basket as recited in claim 9, wherein the cap includes an internal conical element which extends upwardly from the bottom wall of the cap, into the second flared channel of the outlet orifice, and, in some cases, depending on the thickness of the gasket, extends into the first substantially cylindrical channel of the outlet orifice.

11. The brew basket as recited in claim 10, wherein the internal conical element has a substantially hollow interior and a base that circumscribes the opening which is defined through the bottom wall of the cap, wherein the internal conical element defines an upper surface, with a hole defined through the upper surface, and wherein the internal conical element further defines one or more openings through a lateral surface of the internal conical element, such that the brewed beverage (i) passes through the hole defined through the upper surface of the internal conical element, through the hollow interior of the internal conical element, and out the opening defined through the bottom wall of the cap, and (ii) in some cases, depending on the thickness of the gasket, also enters the hollow interior of the internal conical element through the one or more openings defined through the lateral surface of the internal conical element and then out the opening defined through the bottom wall of the cap.

12. The brew basket as recited in claim 9, wherein the cap includes internal threads that engage corresponding external threads of the downward extension of the brew basket.

13. A beverage brewer, comprising:
a housing;
a spray head mounted to the housing and operably connected to a source of water; and
a brew basket, including
a body defining an internal cavity for holding a quantity of a beverage component below the spray head, such that, in use, water introduced by the spray head contacts and passes through the beverage component to produce a brewed beverage,
a downward extension that defines an outlet orifice for the brewed beverage, a cap engaging the downward extension of the brew basket, with an opening defined through a bottom wall of the cap, and a gasket received in the cap, wherein a thickness of the gasket determines a position of the cap relative to the downward extension of the brew basket, and thus determines a flow rate of the brewed beverage from the outlet orifice through the opening defined through the bottom wall of the cap;

wherein the cap includes an internal conical element which extends upwardly from the bottom wall of the cap, wherein the internal conical element has a substantially hollow interior and a base that circumscribes the opening which is defined through the bottom wall of the cap, wherein the internal conical element defines an upper surface, with a hole defined through the upper surface, and wherein the internal conical element further defines one or more openings through a lateral surface of the internal conical element, such that the brewed beverage (i) passes through the hole defined through the upper surface of the internal conical element, through the hollow interior of the internal conical element, and out the opening defined through the bottom wall of the cap, and (ii) in some cases, depending on the thickness of the gasket, also enters the hollow interior of the internal conical element through the one or more openings defined through the lateral surface of the internal conical element and then out the opening defined through the bottom wall of the cap.

14. The beverage brewer as recited in claim 13, wherein the cap includes internal threads that engage corresponding external threads of the downward extension of the brew basket.

15. A beverage brewer, comprising:
a housing;
a spray head mounted to the housing and operably connected to a source of water; and
a brew basket, including
a body defining an internal cavity for holding a quantity of a beverage component below the spray head, such that, in use, water introduced by the spray head contacts and passes through the beverage component to produce a brewed beverage,
a downward extension that defines an outlet orifice for the brewed beverage,
a cap engaging the downward extension of the brew basket, with an opening defined through a bottom wall of the cap, and
a gasket received in the cap, wherein a thickness of the gasket determines a position of the cap relative to the downward extension of the brew basket, and thus determines a flow rate of the brewed beverage from the outlet orifice through the opening defined through the bottom wall of the cap;
wherein the outlet orifice is characterized as including (i) a first substantially cylindrical channel having a predetermined inner diameter that begins at and extends downwardly from a bottom floor of the brew basket, with (ii) a second flared channel at an opposite end of the substantially cylindrical channel.

16. The beverage brewer as recited in claim 15, wherein the cap includes an internal conical element which extends upwardly from the bottom wall of the cap, into the second flared channel of the outlet orifice, and, in some cases, depending on the thickness of the gasket, extends into the first substantially cylindrical channel of the outlet orifice.

17. The beverage brewer as recited in claim 16, wherein the internal conical element has a substantially hollow interior and a base that circumscribes the opening which is defined through the bottom wall of the cap, wherein the internal conical element defines an upper surface, with a hole defined through the upper surface, and wherein the internal conical element further defines one or more openings through a lateral surface of the internal conical element, such that the brewed beverage (i) passes through the hole defined through the upper surface of the internal conical element, through the hollow interior of the internal conical element, and out the opening defined through the bottom wall of the cap, and (ii) in some cases, depending on the thickness of the gasket, also enters the hollow interior of the internal conical element through the one or more openings defined through the lateral surface of the internal conical element and then out the opening defined through the bottom wall of the cap.

18. The beverage brewer as recited in claim 15, wherein the cap includes internal threads that engage corresponding external threads of the downward extension of the brew basket.

* * * * *

UNITED STATES PATENT AND TRADEMARK OFFICE
CERTIFICATE OF CORRECTION

PATENT NO. : 9,795,248 B2
APPLICATION NO. : 15/282410
DATED : October 24, 2017
INVENTOR(S) : Robert M. Ench Page 1 of 1

It is certified that error appears in the above-identified patent and that said Letters Patent is hereby corrected as shown below:

In the Claims

Claim 9, Column 8, Line 15, insert -- , -- between "basket" and "with".

Signed and Sealed this
Twenty-eighth Day of November, 2017

Joseph Matal
*Performing the Functions and Duties of the
Under Secretary of Commerce for Intellectual Property and
Director of the United States Patent and Trademark Office*